3,038,925
O-ALKYL S-CHLOROALLYL PHOSPHORAMIDOTHIOATES

Herman O. Senkbeil, Midland, Mich., assignor to The Dow Chemical Company, Midland, Mich., a corporation of Delaware
No Drawing. Filed Dec. 16, 1960, Ser. No. 76,092
6 Claims. (Cl. 260—461)

This invention is directed to phosphoramidothioates corresponding to the formula:

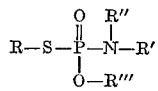

In this and succeeding formulae, R is a member selected from the group consisting of 2-chloroallyl and 3-chloroallyl, R' and R" are each selected from the group consisting of hydrogen and lower alkyl, R'" is lower alkyl. The expression "lower alkyl" in the specification and claims is used to represent alkyl radicals containing from one to five carbon atoms, inclusive. These compounds are liquid materials which are somewhat soluble in many common organic solvents and of very low solubility in water. The compounds are useful as active toxicants in herbicidal compositions and in compositions for the control of insect and helminth organisms such as mites, aphids, beetles, houseflies and worms.

The novel compounds of the invention are prepared by reacting a lower alcohol, R'"OH, with an alkali metal to produce the alkali metal alkoxide, R'"ONa, and thereafter reacting the alkoxide with an S-(2-chloroallyl) or S-(3-chloroallyl) phosphoramidochloridothioate having the formula:

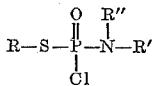

The reaction is most conveniently carried out in an alcohol reaction medium, R'"OH, corresponding to the alkoxide employed and at a reaction temperature of about 0° to about 50° C. The amount of the reagents to be employed is not critical, some of the desired product being obtained when employing any proportion of the reactants.

In a preferred method of operation, one molar proportion of the alkali metal is dispersed in an excess of the alcohol reagent to produce the alkoxide and then gradually admixed with the S-chloroallyl phosphoramidochloridothioate dissolved in an additional excess of the alcohol. The temperature of the reaction medium is preferably maintained in the range of about 0° to about 50° C. After the complete addition of the alkoxide, agitation of the reaction mixture is continued at room temperature until the reaction is completed, an alkali metal chloride being formed as a by-product. The reaction mixture is then preferably filtered and the reaction medium is evaporated from the resulting filtrate under reduced pressure to obtain the desired product as a residue. This product may be further purified by conventional procedures such as washing and extraction.

The following examples merely illustrate the invention and are not to be construed as limiting.

*Example 1.—S-(2-Chloroallyl) O-Methyl N-Methyl Phosphoramidothioate*

One hundred milliliters of methanol was reacted with 1.6 grams (0.07 mole) of sodium to prepare sodium methoxide. The latter was added portionwise with stirring over a 0.5 hour period to 15.4 grams (0.07 mole) of S-(2-chloroallyl) N-methyl phosphoramidochloridothioate (refractive index of 1.5656 at 25° C.) dissolved in 100 milliliters of methanol, at a temperature of 3°–5° C. Completion of the reaction was then obtained by stirring the mixture for about 15 hours at room temperature (about 22° C.). Sodium chloride, formed as a by-product, was removed by filtration, and excess methanol was removed by evaporation under reduced pressure. The resulting residue was purified by dissolving in 100 milliliters of methylene chloride and extracting the solution with two 100-milliliter portions of water. The solution was then dried over calcium chloride and filtered. After removal of the methylene chloride solvent by evaporation, there was obtained an S-(2-chloroallyl) O-methyl N-methyl phosphoramidothioate product as a viscous, light-brown, liquid residue having a molecular weight of 215.7 and a refractive index of 1.5410 at 25° C.

*Example 2.—S-(2-Chloroallyl) O-Ethyl N-Methyl Phosphoramidothioate*

One hundred milliliters of ethanol was reacted with 1.6 grams (0.07 mole) of sodium to prepare sodium ethoxide. The latter was added portionwise with stirring over a one hour period to 15.4 grams (0.07 mole) of S-(2-chloroallyl) N-methyl phosphoramidochloridothioate dissolved in 100 milliliters of ethanol, at a temperature of 5° C. Completion of the reaction was then obtained by stirring the mixture for about 15 hours at room temperature (22°–23° C.). Sodium chloride, formed as a by-product, was removed by vacuum filtration, and excess ethanol was removed by evaporation under reduced pressure. The resulting residue was purified by dissolving in 100 milliliters of methylene chloride and extracting the solution with two 100-milliliter portions of water. The solution was then dried over calcium chloride and filtered. After removal of the methylene chloride solvent by evaporation, there was obtained an S-(2-chloroallyl) O-ethyl N-methyl phosphoramidothioate product as a viscous, light-brown, liquid residue having a molecular weight of 229.7 and a refractive index of 1.5338 at 25° C.

*Example 3.—S-(3-Chloroallyl) O-Isopropyl N,N-Dibutyl Phosphoramidothioate*

One hundred milliliters of isopropyl alcohol was reacted with 2.0 grams (0.085 mole) of sodium to prepare sodium isopropoxide. The latter was added portionwise with stirring over a 0.5 hour period to 27 grams (0.085 mole) of S-(3-chloroallyl) N,N-dibutyl phosphoramidochloridothioate (refractive index of 1.5155 at 25° C.) dissolved in 50 milliliters of isopropyl alcohol, at a temperature of 25°–30° C. Completion of the reaction was then obtained by stirring the mixture for about two hours at room temperature (about 23° C.). The excess isopropyl alcohol was removed by evaporation under reduced pressure, and the resulting impure residue was dissolved in carbon bisulfide. After filtering to remove the by-product sodium chloride, the solution was placed in a rotating vacuum evaporator at room temperature to remove the carbon bisulfide. As a result there was obtained an S-(3-chloroallyl) O-isopropyl N,N-dibutyl phosphoramidothioate product as a viscous, brown liquid residue having a molecular weight of 341.5 and a refractive index of 1.500 at 25° C.

In the same manner, other O-alkyl S-chloroallyl phosphoramidothioates are prepared of which the following are representative:

S-(2-chloroallyl) O-methyl N-isopropyl phosphoramidothioate by reacting sodium methoxide with S-(2-chloroallyl) N-isopropyl phosphoramidochloridothioate.

S-(3-chloroallyl) O-methyl N-isopropyl phosphoramidothioate by reacting sodium methoxide with S-(3-chloroallyl) N-isopropyl phosphoramidochloridothioate.

S-(2-chloroallyl) O-methyl phosphoramidothioate by reacting sodium methoxide with S-(2-chloroallyl) phosphoramidochloridothioate.

S-(2-chloroallyl) O-methyl N-ethyl phosphoramidothioate by reacting sodium methoxide with S-(2-chloroallyl) N-ethyl phosphoramidochloridothioate.

S-(2-chloroallyl) O-ethyl N-ethyl phosphoramidothioate by reacting sodium ethoxide with S-(2-chloroallyl) N-ethyl phosphoramidochloridothioate.

S-(3-chloroallyl) O-propyl N,N-dimethyl phosphoramidothioate by reacting sodium propoxide with S-(3-chloroallyl) N,N-dimethylphosphoramidochloridothioate.

S-(3-chloroallyl) O-butyl N,N-diethyl phosphoramidothioate by reacting sodium butoxide with S-(3-chloroallyl) N,N-diethyl phosphoramidochloridothioate.

S-(2-chloroallyl) O-pentyl N-methyl phosphoramidothioate by reacting potassium amoxide with S-(2-chloroallyl) N-methyl phosphoramidochloridothioate.

S-(2-chloroallyl) O-methyl N-pentyl phosphoramidothioate by reacting sodium methoxide with S-(2-chloroallyl) N-pentyl phosphoramidochloridothioate.

S-(3-chloroallyl) O-ethyl N-propyl phosphoramidothioate by reacting sodium ethoxide with S-(3-chloroallyl) N-propyl phosphoramidochloridothioate.

The new compounds of this invention have been found to be useful as herbicides for the control of undesired vegetation and as insecticides and parasiticides for the control of a number of mites, insects and other parasitic organisms. For such uses, the products may be dispersed on a finely divided solid and employed as dusts. Also, the compounds may be dispersed in water with the aid of a wetting agent and the resulting aqueous suspensions employed as sprays. In other procedures, the products may be employed as constituents of solvent solutions or of oil-in-water emulsions or water dispersions with or without the addition of wetting, dispersing or emulsifying agents. In a representative operation, aqueous compositions containing 25 parts by weight of S-(2-chloroallyl) O-methyl N-methyl phosphoramidothioate per million parts by weight of the composition gave 100 percent kills of two-spotted spider mites.

The S-(2-chloroallyl) and S-(3-chloroallyl) phosphoramidochloridothioates employed as starting materials, as heretofore described, may be prepared by the following procedure. Sodium hydrosulfide is reacted with beta, gamma-dichloropropylene or alpha, gamma-dichloropropylene in accordance with the teachings of U.S. Patent 2,100,968 to produce, respectively, the 2-chloroallyl and 3-chloroallyl mercaptans. One molecular proportion of the desired chloroallyl mercaptan is then reacted at 0°–50° C. with phosphorus oxychloride to produce an S-chloroallyl phosphorodichloridothioate. This reaction is carried out in an inert solvent such as benzene or toluene and in the presence of a HCl acceptor such as pyridine. One molecular proportion of the S-chloroallyl phosphorodichloridothioate is then reacted at 0°–50° C. with two molecular proportions of ammonia or a lower-alkyl amine having the formula:

In carrying out the reaction, the amine is added portionwise to the phosphorodichloridothioate dissolved in an inert solvent such as benzene or toluene. Upon completion of the reaction, the hydrochloride by-product is separated by filtration and the inert solvent removed by evaporation to obtain the desired S-chloroallyl phosphoramidochloridothioate as a residue.

I claim:

1. The compounds corresponding to the formula:

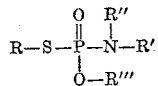

wherein R is a member selected from the group consisting of 2-chloroallyl and 3-chloroallyl, R′ and R″ are each selected from the group consisting of hydrogen and lower alkyl, and R‴ is lower alkyl.

2. S-(2-chloroallyl) O-methyl N-methyl phosphoramidothioate.

3. S-(2-chloroallyl) O-ethyl N-methyl phosphoramidothioate.

4. S-(3-chloroallyl) O-isopropyl N,N-dibutyl phosphoramidothioate.

5. S-(2-chloroallyl) O-methyl N-isopropyl phosphoramidothioate.

6. S-(3-chloroallyl) O-methyl N-isopropyl phosphoramidothioate.

No references cited.